(12) United States Patent
Jackson et al.

(10) Patent No.: US 7,178,389 B2
(45) Date of Patent: Feb. 20, 2007

(54) METHOD AND APPARATUS FOR SCAVENGING AND USING ENERGY CAUSED BY CHANGES IN PRESSURE

(75) Inventors: Stephen Billings Jackson, La Honda, CA (US); Gregory Paul Schmitz, Los Gatos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 66 days.

(21) Appl. No.: 11/013,327

(22) Filed: Dec. 17, 2004

(65) Prior Publication Data

US 2006/0130589 A1   Jun. 22, 2006

(51) Int. Cl.
  *E01C 23/00* (2006.01)
(52) U.S. Cl. ......................................................... 73/146
(58) Field of Classification Search ................... 73/146, 73/702, 146.3, 146.2, 146.8, 862.325
See application file for complete search history.

(56) References Cited

U.S. PATENT DOCUMENTS

| | | | |
|---|---|---|---|
| 4,160,234 A | 7/1979 | Karbo et al. | |
| 4,384,482 A | 5/1983 | Snyder | |
| 4,529,961 A * | 7/1985 | Nishimura et al. | 340/447 |
| 5,040,561 A | 8/1991 | Achterholt | |
| 5,109,213 A | 4/1992 | Williams | |
| 5,285,189 A | 2/1994 | Nowicki et al. | |
| 5,606,123 A | 2/1997 | Rabizadeh | |
| 5,731,516 A | 3/1998 | Handfield et al. | |
| 5,838,229 A | 11/1998 | Robinson, III | |
| 5,853,020 A | 12/1998 | Widner | |
| 5,965,808 A | 10/1999 | Normann et al. | |
| 6,031,450 A | 2/2000 | Huang | |
| 6,175,301 B1 | 1/2001 | Piesinger | |
| 6,199,575 B1 | 3/2001 | Widner | |
| 6,243,007 B1 | 6/2001 | McLaughlin et al. | |
| 6,278,363 B1 | 8/2001 | Bezek et al. | |
| 6,340,930 B1 | 1/2002 | Lin | |
| 6,378,360 B1 | 4/2002 | Bartels | |
| 6,438,193 B1 | 8/2002 | Ko et al. | |
| 6,518,877 B1 | 2/2003 | Starkey et al. | |
| 6,807,853 B2 * | 10/2004 | Adamson et al. | 73/146 |

* cited by examiner

*Primary Examiner*—Jewel Thompson
(74) *Attorney, Agent, or Firm*—Oliff & Berridge, PLC

(57) ABSTRACT

An apparatus to scavenge energy caused by changes in interior pressure of a container, including at least one flexible chamber containing a fluid at a predetermined pressure; a piezoelectric element coupled to the flexible chamber so as to generate electricity when the flexible chamber is flexed by a change in interior pressure of the container.

19 Claims, 5 Drawing Sheets

METHOD AND APPARATUS FOR SCAVENGING AND USING ENERGY CAUSED BY CHANGES IN PRESSURE

BACKGROUND

This invention relates to methods and apparatus for scavenging and using energy caused by changes in pressure. This includes but is not limited to using changes of pressure in closed or substantially closed atmosphere environments to create electrical energy which is then used as a power source.

The invention will be described in reference to pneumatic devices and in particular pneumatic tires used in vehicles. However, this description is one exemplary embodiment of the invention and systems and methods of the invention are applicable to any circumstance where changes in pressure occur at a frequency that they may be used to convert mechanical energy to electrical energy.

Tire safety studies show that maintaining proper tire pressure improves vehicle handling, improves fuel economy, increases tire life and helps avoid accidents. An NHTSA research survey of U.S. passenger vehicles found that 27% of passenger cars on U.S. roadways were driven with one or more substantially under-inflated tire. The survey found that 33% of light trucks (including sport utility vehicles, vans and pickup trucks) are driven with one or more substantially under-inflated tire. Other studies have shown that nearly 20% of service stations providing customers with tire pressure gauges on their air pumps use gauges that over report the pressure present in a tire by at least 4 psi (pounds per square inch) or more. At pressure levels that are typical for most passenger cars or SUVs, nearly 10% of service station air pump gauges over report by 6 psi or more. In addition, radial tires can lose much of their tire air pressure and still appear to be fully inflated.

In response to this safety issue, the federal government has enacted standards which require motor vehicles to become equipped with tire pressure monitoring systems. The standards specify performance requirements for tire pressure monitoring systems to prevent significant under-inflation of tires and the resulting safety problems. The standard applies to passenger cars, multipurpose passenger vehicles, trucks and buses that have a gross vehicle weight rated of 10,000 pounds or less. The tire pressure monitoring system refers to a system that detects when one or more of the vehicles tires are under-inflated and illuminates a low tire pressure warning telltale. The low tire pressure warning telltale must be mounted inside the occupant compartment in front of and in clear view of the driver. The tire pressure monitoring system must continue to meet the requirements of the standard when the vehicle's original tires are replaced with tires of any optional or replacement size.

Related art tire pressure monitoring systems provide vehicles using pneumatic tires with a system having a sensor to sense conditions of a tire. See U.S. Pat. Nos. 6,438,193 and 6,518,877 which are hereby incorporated by reference. The conditions may include internal pressure, temperature, number of revolutions, etc. Related art systems are mounted in the tire and include a transmitter which communicates sensed data to a receiver located in the vehicle. The sensed data may then be communicated to the vehicle operator via a user interface, such as a display. The related art systems are often powered by batteries which wear out and need to be replaced. This increases labor costs and hazardous waste. This may also result in system failures due to lack of power during the operation of the vehicle.

SUMMARY

The invention provides a power supply by providing methods and systems that convert mechanical energy to electric energy and in particular the changes in pressure of a rotating tire into electric energy, which is then stored and used to power the tire based components of a tire pressure monitoring system. As a tire rotates, turns and otherwise trundles down a road, its internal volume is constantly changing causing variations of pressure inside the tire. These pressure fluctuations can be used to cause mechanical changes in a mechanical portion which are transmitted to a piezoelectric element. The piezoelectric element is distorted by the mechanical changes and generates electrical energy. The electrical energy is stored and delivered to the tire mounted portion of the tire pressure monitoring system via an electric circuit.

In an exemplary embodiment of the invention, an aneroid cell is the mechanical portion of the system and is linked to a piezoelectric element so that mechanical changes in the aneroid cell cause mechanical changes in the piezoelectric element.

In another exemplary embodiment of the invention, a bourdon tube is the mechanical portion of the system and is linked to a piezoelectric element so that mechanical changes in the bourdon tube cause mechanical changes in. the piezoelectric element.

In another exemplary embodiment of the invention the piezoelectric element is formed to surround the mechanical portion so that mechanical changes in the mechanical portion are directly transmitted to the piezoelectric element.

In another exemplary embodiment of the invention the piezoelectric element is linked mechanically to the mechanical portion so that mechanical changes in the mechanical portion are transmitted through the mechanism linkages to the piezoelectric element.

In another exemplary embodiment of the invention, the various exemplary embodiments of the invention are mounted on a valve stem.

In another exemplary embodiment of the invention, electrical energy created by the piezoelectric element is stored in a capacitor.

In another exemplary embodiment of the invention, electrical energy created by the piezoelectric element is stored in a battery.

In another exemplary embodiment of the invention, the tire pressure monitoring system includes a sensor that senses at least one of tire pressure, tire temperature and tire revolutions.

In another exemplary embodiment of the invention, data sensed by the sensor is transmitted to a receiver and the data received by the receiver is communicated to the user via a user interface.

DETAILED DESCRIPTION OF EXEMPLARY EMBODIMENTS

Figure 1:
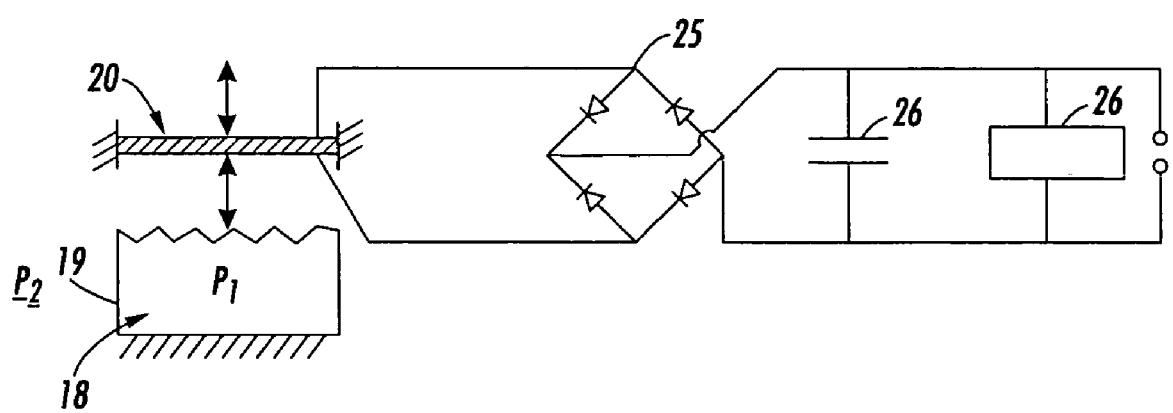
FIG. 1 is a schematic of an apparatus for scavenging and using energy caused by changes in pressure according to one exemplary embodiment of the invention.
Figure 4:
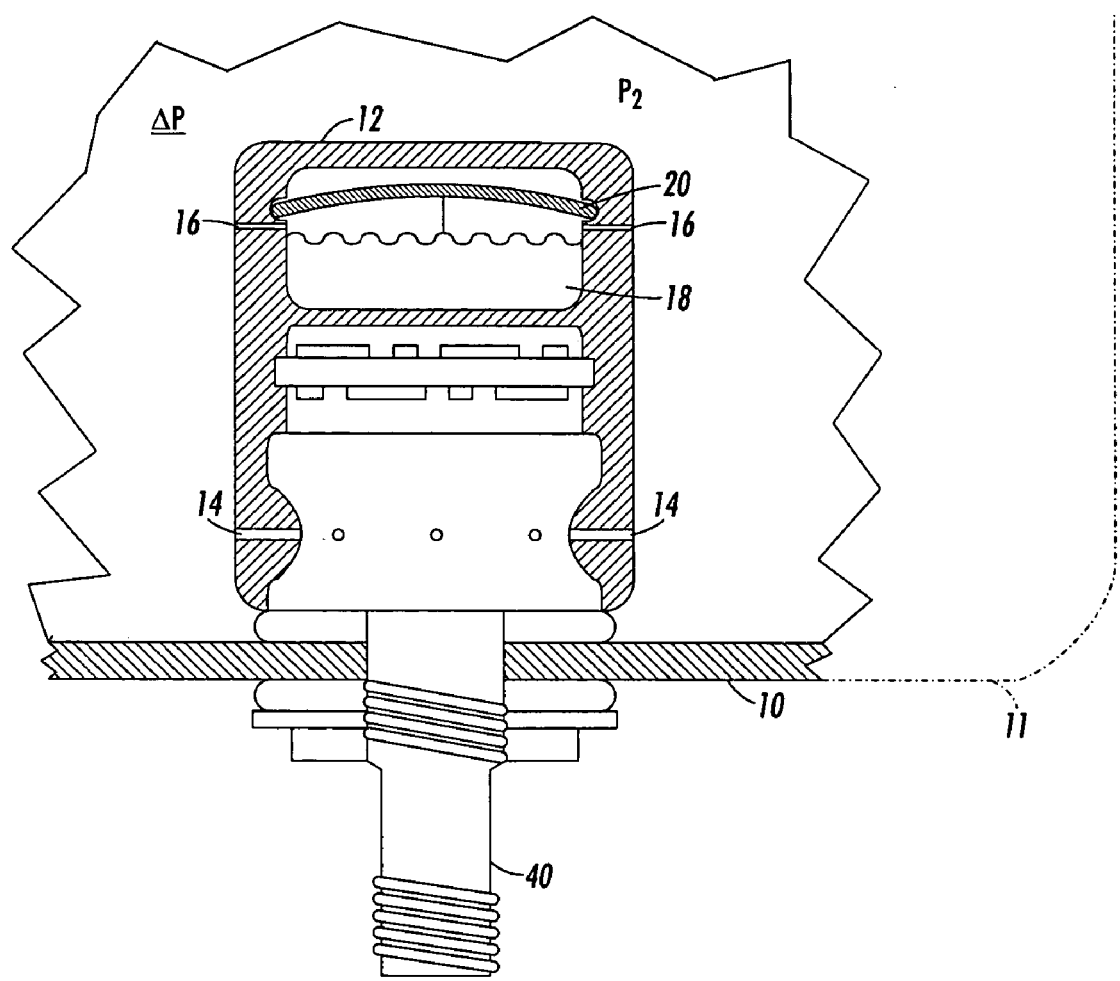
FIG. 4 is a schematic of a method of mounting an apparatus for scavenging and using energy caused by changes by pressure according to an exemplary aspect of the invention.
Figure 5A:
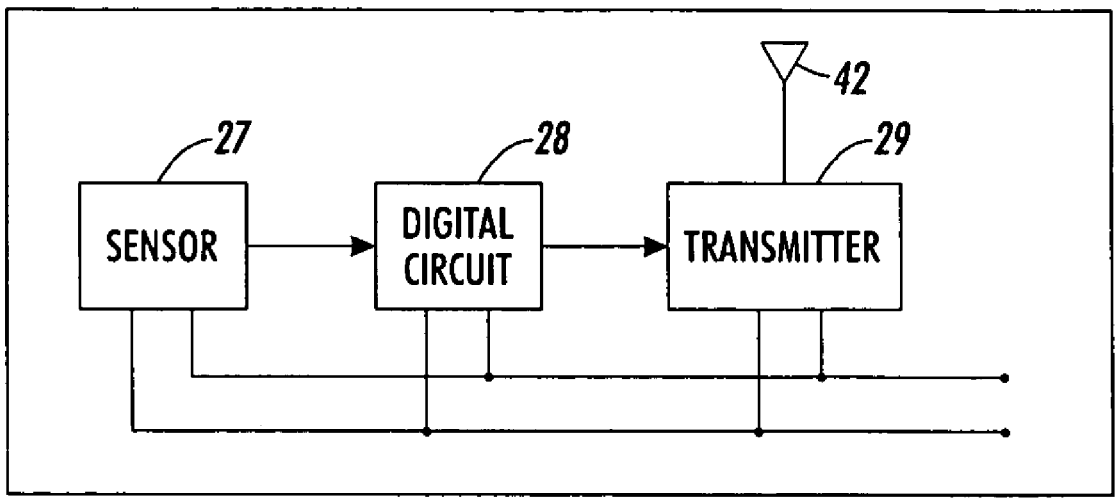
FIGS. 5A and 5B are schematics of a sensed data receiver and transmitter according to an exemplary aspect of the invention.
Figure 5B:
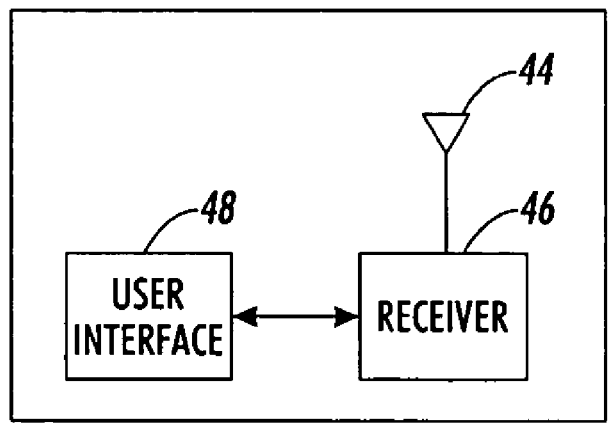

FIG. 1 is a schematic of an exemplary embodiment of the invention using a aneroid chamber as the mechanical portion. FIG. 4 is a schematic of the exemplary embodiment of FIG. 1 mounted on the valve stem of a pneumatic tire. However, it should be appreciated that any environment with sufficient changes in pressure over a sufficient time period would be suitable to create the mechanical changes in the mechanical portion necessary to satisfy the requirements of the exemplary embodiments of the invention.

As the tire trundles down the road, interior pressure P2 is constantly changing. The changes in pressure ΔP are communicated to the aneroid chamber 18 via the interim atmosphere of the pneumatic tire 11. The aneroid chamber 18 is a tightly sealed chamber or series of chambers containing air at a predetermined pressure. The pressure P1 of the aneroid chamber may be matched to the manufacturers recommended cold inflation pressure of the tire. Aneroid chambers are well-known to detect changes in atmospheric pressure. They may be formed from any suitable material, such as stainless steel or brass. The piezoelectric element 20 is placed in relation to the aneroid chamber 18 so that expansions or contractions of the aneroid chamber 18 caused by changes in air pressure P2 inside the tire 11 cause mechanical changes in the piezoelectric element 20 thus generating electrical energy. The use of piezoelectric elements is well-known. See U.S. Pat. No. 6,438,193 which is hereby incorporated by reference.

Figure 2A:
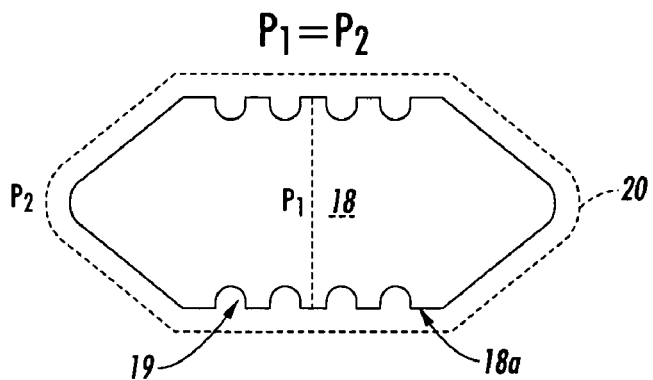
FIGS. 2A–2C are schematics of an aneroid chamber used as the pressure reactor according to an exemplary embodiment of the invention.
Figure 2B:
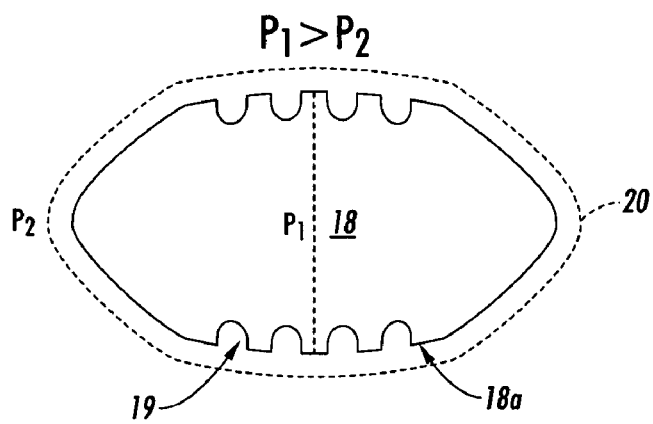
Figure 2C:
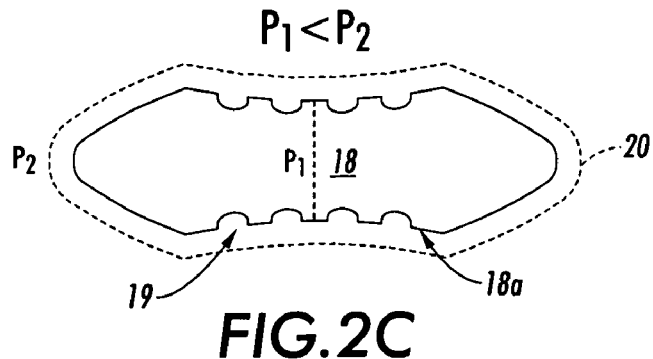

FIGS. 2A–2C are schematics showing the effects of the changes of pressure P2 on the aneroid chamber 18. It should be appreciated that FIGS. 2A–2C are not drawn to scale and features are exaggerated for representation and explanation purposes.

FIG. 2A shows an aneroid chamber 18. In the wall 18A of the aneroid chamber 18, there are formed circular corrugations 19. The corrugations are formed in any suitable size, number and shape to make the wall 18A flexible to provide a desired mechanical change in the shape of the aneroid chamber 18 when subjected to changes in pressure P2. It should be appreciated that the corrugations 19 are optional. Furthermore, it should be appreciated that the aneroid chamber 18 may be any suitable size or shape so long as the aneroid chamber 18 is able to be influenced mechanically by the changes in pressure P2.

In FIG. 2A, the pressure P1 is equal to pressure P2. There are no mechanical changes in the aneroid chamber 18. Thus, the piezoelectric element 20 does not experience any mechanical changes and no electricity is generated.

FIGS. 2A–2C show an exemplary embodiment of the invention where the piezoelectric element 30 is formed to surround the aneroid chamber 20. However, it should be appreciated the various exemplary embodiments of the invention include forming or positioning a piezoelectric element in any suitable relationship such that mechanical changes caused by changes in pressure P2 cause mechanical changes in the piezoelectric element 20. For example, it is well known to transmit mechanical changes in aneroid chambers using mechanical linkages.

In FIG. 2B the pressure P1 is greater than P2. This causes the wall 18A to deflect outward at those portions where the corrugations 19 are formed. The deflection of the wall 18A causes a similar deflection in the piezoelectric element 20. Thus, electrical energy is generated. Similarly, FIG. 2C shows the result when the pressure P1 is less than P2. This causes the wall 18A to deflect outward at those portions where the corrugations are formed. The deflection of the wall 18A causes a similar deflection in the piezoelectric element 20. Thus, electricity is generated.

Figure 3A:
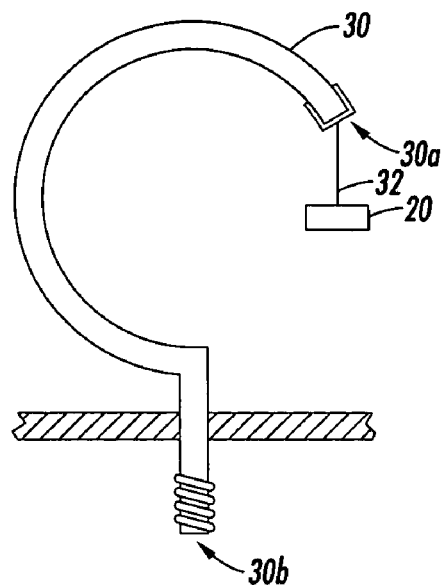
FIGS. 3A–3C are schematics of a bourdon tube used as a pressure reactor according to an exemplary embodiment of the invention.
Figure 3B:
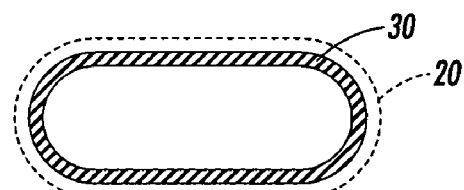
Figure 3C:
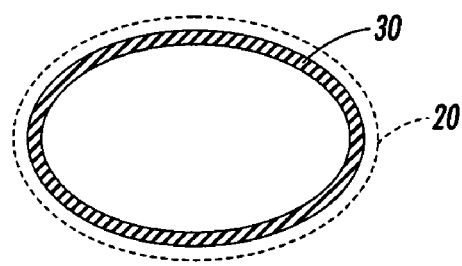

FIGS. 3A–3C are schematics of an exemplary embodiment of the invention using a bourdon tube 30 as the pressure reactor.

FIG. 3A is a schematic of a C-shaped bourdon tube 30. The bourdon tube 30 has a hollow elliptical cross section as shown in FIG. 3B. One end 30A of the bourdon tube 30 is closed. The other end 30B is open to the pressure P2. The walls 30C are thin and change shape when there are changes in pressure P2. The open end 30B is fixed. Thus, changes in pressure P2 cause changes in the position of the closed end 30A. The tube 30 is formed to be bent into an arc of a circle generally between 270 to 300 degrees. When pressure P2 is increased, the cross section becomes more circular as shown in FIG. 3C. This causes the tube to straighten out until the force of the fluid pressure is balanced by the elastic resistance of the tube 30.

A piezoelectric element 20 is put in mechanical relation through the use of well known mechanical linking elements to either the tube walls or the closed end of the tube, so that changes in the shape or position of either will cause mechanical changes to the piezoelectric element and electricity is generated. The piezoelectric element 20 may be placed in any suitable relationship to the bourdon tube 30 to transfer the mechanical change. FIG. 3A shows a mechanical linkage 32. Mechanical linkages for transferring mechanical changes of bourdon tubes are well known. FIGS. 3B and 3C show a configuration where the piezoelectric element 20 is formed to surround the bourdon tube 20.

The electrical energy generated by the piezoelectric element 20 is ac. The energy is conditioned by the rectifier 25 and the regulator 26 to convert the ac signals to a stable DC power supply. The power supply is stored in storage 26 and used to supply power to sensor 27, digital circuit 28 and transmitter 29. Storage 26 may be any suitable electricity storage device such as a capacitor on battery. The digital circuit processes the sensor signals and communicates with the transmitter 29 which conditions the signals generated by the sensors 27 for transmission and broadcasts a signal representative of at least one of the vehicle tire parameters being monitored via antenna 42. The broadcast signal is received by antenna 44 which is in communication with receiver 40. The receiver 46 processes the received signal which is then communicated to a user through a user interface, such as a display or an audio warning system.

In the exemplary embodiment of FIG. 4 the apparatus of an exemplary embodiment of the invention is mounted on valve stem 40 which in turn is mounted on a tire rim 10 on pneumatic tire 11. It should be appreciated that the apparatus of an exemplary embodiment of the invention may be formed integrally with the valve stem 40 to facilitate mounting during vehicle manufacture or when new tires are mounted. Alternatively, the apparatus of an exemplary embodiment of the invention may be formed to be mounted on the valve system 40 by any suitable means such as threads, clips, etc. It should further be appreciated that the apparatus of an exemplary embodiment of the invention may be mounted in any suitable location so long that the pressure changes of the environment create mechanical changes in the apparatus of the exemplary embodiments of the invention.

In the exemplary embodiment of FIG. 4 a housing 12 is provided to enclose the apparatus. The housing 12 may be formed of any suitable material to provide protection during handling, installation and use of the apparatus of the exemplary embodiment of the invention. The housing 12 includes inlets 14 and vents 16 to allow the pressure changes of the interior of the tire to reach the mechanical portion.

In various exemplary embodiments of the invention, the mechanical portion may also be used as a pressure sensor.

While the invention has been described with reference to exemplary embodiments, it is to be understood that the invention is not limited to the exemplary embodiments or constructions. While the various elements of the exemplary embodiments are shown in various combinations and configurations, which are exemplary, other combinations and configurations, including more, less or only a single element, are also within the spirit and scope of the invention.

What is claimed is:

1. An apparatus to scavenge energy caused by changes in interior pressure of a container, comprising:
   a pneumatic container having the interior pressure;
   at least one flexible chamber containing a fluid at a predetermined pressure; and
   a piezoelectric element coupled to the at least one flexible chamber and communicatively coupled to the interior pressure of the pneumatic container so as to generate electricity when the flexible chamber is flexed by a change in the interior pressure of the pneumatic container;
   wherein the piezoelectric element is formed to surround the flexible chamber.

2. The apparatus of claim 1, further comprising:
   an electricity storage device to store electricity generated by the piezoelectric element.

3. The apparatus of claim 2, further comprising:
   at least one sensor to measure a condition relevant to the pneumatic container and powered by the electricity storage device.

4. The apparatus of claim 3 wherein the at least one sensor is at least one of a pressure sensor, a temperature sensor, and a tire rotation counter.

5. The apparatus of claim 3, further comprising:
   a transmitter to transmit data related to the measured condition;
   a receiver to receive the transmitted data; and
   a user interface to communicate the received data to a user.

6. The apparatus of claim 2 wherein the storage device includes a rectifier, a regulator and a capacitor.

7. The apparatus of claim 2 wherein the storage device includes a rectifier, a regulator and a battery.

8. The apparatus of claim 1 wherein the flexible chamber is an aneroid chamber.

9. The apparatus of claim 1, wherein the flexible chamber serves as a sensor.

10. The apparatus of claim 1 wherein the apparatus is mounted to a valve.

11. The apparatus of claim 1, wherein a moving portion of the piezoelectric element is linked mechanically to the flexible chamber.

12. An apparatus to scavenge energy caused by changes in interior pressure of a container, comprising:
    a pneumatic container having the interior pressure;
    at least one bourdon tube; and
    a piezoelectric element coupled to the at least one bourdon tube and communicatively coupled to the interior pressure of the pneumatic container so as to generate electricity when the bourdon tube is flexed by a change in the interior pressure of the pneumatic container;
    wherein the piezoelectric element is formed to surround the at least one bourdon tube.

13. The apparatus of claim 12, further comprising:
    an electricity storage device to store electricity generated by the piezoelectric element.

14. The apparatus of claim 13, further comprising:
    at least one sensor to measure a condition relevant to the pneumatic container and powered by the electricity storage device.

15. The apparatus of claim 14, wherein the at least one sensor is at least one of a pressure sensor, a temperature sensor, and a tire rotation counter.

16. The apparatus of claim 14, further comprising:
    a transmitter to transmit data related to the measured condition;
    a receiver to receive the transmitted data; and
    a user interface to communicate the received data to a user.

17. The apparatus of claim 13, wherein the voltage storage device includes a rectifier, a regulator and a capacitor.

18. The apparatus of claim 13, wherein the voltage storage device includes a rectifier, a regulator and a battery.

19. A pneumatic tire for a vehicle, comprising:
    a wall defining an interior portion of the tire, the interior portion having a fluctuating pressure when the vehicle is moving;
    at least one flexible chamber containing a fluid at a predetermined pressure;
    a piezoelectric element coupled to the at least one flexible chamber and communicatively coupled to the interior pressure of the pneumatic container so as to generate electricity when the at least one flexible chamber is flexed by the fluctuating pressure of the interior portion;
    an electricity storage device to store electricity generated by the piezoelectric element;
    at least one sensor to measure a condition relevant to the pneumatic tire and powered by the electricity storage device; and
    a transmitter to transmit data related to the sensed condition;
    wherein the piezoelectric element is formed to surround the at least one flexible chamber.

* * * * *